United States Patent
Kuo et al.

(10) Patent No.: US 12,521,207 B2
(45) Date of Patent: *Jan. 13, 2026

(54) ORTHODONTIC APPLIANCES THAT ACCOMMODATE INCREMENTAL AND CONTINUOUS TOOTH MOVEMENT, SYSTEMS AND METHODS

(71) Applicant: Align Technology, Inc., San Jose, CA (US)

(72) Inventors: Eric Kuo, San Jose, CA (US); Rick Matty, Scotts Valley, CA (US); Artem Borovinskih, San Jose, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,982

(22) Filed: Mar. 21, 2024

(65) Prior Publication Data

US 2024/0225787 A1    Jul. 11, 2024

Related U.S. Application Data

(60) Division of application No. 16/852,274, filed on Apr. 17, 2020, now Pat. No. 11,974,896, which is a continuation of application No. 14/660,375, filed on Mar. 17, 2015, now Pat. No. 10,624,718, which is a continuation of application No. 13/692,891, filed on Dec. 3, 2012, now Pat. No. 9,022,781.

(60) Provisional application No. 61/599,337, filed on Feb. 15, 2012.

(51) Int. Cl.
*A61C 7/08* (2006.01)
*A61C 7/00* (2006.01)
*A61C 7/12* (2006.01)
*A61C 7/14* (2006.01)
*A61C 7/20* (2006.01)

(52) U.S. Cl.
CPC ............... *A61C 7/08* (2013.01); *A61C 7/002* (2013.01); *A61C 7/12* (2013.01); *A61C 7/14* (2013.01); *A61C 7/20* (2013.01)

(58) Field of Classification Search
CPC .. A61C 7/002; A61C 7/08; A61C 7/12; A61C 7/14; A61C 7/20
See application file for complete search history.

(56) References Cited

U.S. PATENT DOCUMENTS

| | | | |
|---|---|---|---|
| 5,820,368 A | 10/1998 | Wolk | |
| 5,975,893 A * | 11/1999 | Chishti | ............... A61C 9/00 |
| 6,386,864 B1 | 5/2002 | Kuo | |
| 6,454,565 B2 | 9/2002 | Phan et al. | |
| 6,471,511 B1 | 10/2002 | Chishti et al. | |
| 6,607,382 B1 | 8/2003 | Kuo et al. | |
| 6,783,604 B2 | 8/2004 | Tricca | |
| 6,790,035 B2 | 9/2004 | Tricca et al. | |
| 6,814,574 B2 | 11/2004 | Abolfathi et al. | |
| 6,947,038 B1 | 9/2005 | Anh et al. | |
| 7,074,039 B2 | 7/2006 | Kopelman et al. | |

(Continued)

*Primary Examiner* — Ralph A Lewis
(74) *Attorney, Agent, or Firm* — Wilson Sonsini Goodrich & Rosati

(57) ABSTRACT

An orthodontic appliance including a shell aligner having a portion accommodating movement of a patient's bracketed teeth between a first position and the second position as elicited by force from an orthodontic braces appliance worn by the patient, related systems and methods.

20 Claims, 11 Drawing Sheets

(56) References Cited

U.S. PATENT DOCUMENTS

| | | | |
|---|---|---|---|
| 7,104,792 B2 | 9/2006 | Taub et al. | |
| 7,121,825 B2 | 10/2006 | Chishti et al. | |
| 7,160,107 B2 | 1/2007 | Kopelman et al. | |
| 7,347,688 B2 | 3/2008 | Kopelman et al. | |
| 7,354,270 B2 | 4/2008 | Abolfathi et al. | |
| 7,448,514 B2 | 11/2008 | Wen | |
| 7,481,121 B1 | 1/2009 | Cao | |
| 7,543,511 B2 | 6/2009 | Kimura et al. | |
| 7,578,673 B2 * | 8/2009 | Wen | A61C 7/146 433/24 |
| 7,600,999 B2 | 10/2009 | Knopp | |
| 7,766,658 B2 | 8/2010 | Tricca et al. | |
| 7,771,195 B2 | 8/2010 | Knopp et al. | |
| 7,871,269 B2 | 1/2011 | Wu et al. | |
| 7,878,801 B2 | 2/2011 | Abolfathi et al. | |
| 7,883,334 B2 | 2/2011 | Li et al. | |
| 7,914,283 B2 | 3/2011 | Kuo | |
| 7,947,508 B2 | 5/2011 | Tricca et al. | |
| 8,152,518 B2 | 4/2012 | Kuo | |
| 8,152,521 B2 * | 4/2012 | Yamamoto | A61C 7/008 433/24 |
| 8,172,569 B2 | 5/2012 | Matty et al. | |
| 8,235,715 B2 | 8/2012 | Kuo | |
| 8,337,199 B2 | 12/2012 | Wen | |
| 8,401,686 B2 | 3/2013 | Moss et al. | |
| 8,517,726 B2 | 8/2013 | Kakavand et al. | |
| 8,562,337 B2 | 10/2013 | Kuo et al. | |
| 8,641,414 B2 | 2/2014 | Borovinskih et al. | |
| 8,684,729 B2 | 4/2014 | Wen | |
| 8,758,009 B2 | 6/2014 | Chen et al. | |
| 8,899,977 B2 | 12/2014 | Cao et al. | |
| 8,936,463 B2 | 1/2015 | Mason et al. | |
| 8,936,464 B2 | 1/2015 | Kopelman | |
| 9,022,781 B2 * | 5/2015 | Kuo | A61C 7/20 433/24 |
| 9,119,691 B2 | 9/2015 | Namiranian et al. | |
| 9,161,823 B2 | 10/2015 | Morton et al. | |
| 9,241,774 B2 | 1/2016 | Li et al. | |
| 9,326,831 B2 | 5/2016 | Cheang | |
| 9,433,476 B2 | 9/2016 | Khardekar et al. | |
| 9,655,691 B2 | 5/2017 | Li et al. | |
| 9,675,427 B2 | 6/2017 | Kopelman | |
| 9,700,385 B2 | 7/2017 | Webber | |
| 9,844,424 B2 | 12/2017 | Wu et al. | |
| 10,045,835 B2 | 8/2018 | Boronkay et al. | |
| 10,111,730 B2 | 10/2018 | Webber et al. | |
| 10,150,244 B2 | 12/2018 | Sato et al. | |
| 10,213,277 B2 | 2/2019 | Webber et al. | |
| 10,299,894 B2 | 5/2019 | Tanugula et al. | |
| D865,180 S | 10/2019 | Bauer et al. | |
| 10,463,452 B2 | 11/2019 | Matov et al. | |
| 10,517,701 B2 | 12/2019 | Boronkay | |
| 10,537,406 B2 | 1/2020 | Wu et al. | |
| 10,537,463 B2 | 1/2020 | Kopelman | |
| 10,548,700 B2 | 2/2020 | Fernie | |
| 10,555,792 B2 | 2/2020 | Kopelman et al. | |
| 10,588,776 B2 | 3/2020 | Cam et al. | |
| 10,624,718 B2 * | 4/2020 | Kuo | A61C 7/20 |
| 10,743,964 B2 | 8/2020 | Wu et al. | |
| 10,758,323 B2 | 9/2020 | Kopelman | |
| 10,813,720 B2 | 10/2020 | Grove et al. | |
| 10,881,487 B2 | 1/2021 | Cam et al. | |
| 10,912,629 B2 | 2/2021 | Tanugula et al. | |
| 11,026,768 B2 | 6/2021 | Moss et al. | |
| 11,026,831 B2 | 6/2021 | Kuo | |
| 11,103,330 B2 | 8/2021 | Webber et al. | |
| 11,154,382 B2 | 10/2021 | Kopelman et al. | |
| 11,166,788 B2 | 11/2021 | Webber | |
| 11,259,896 B2 | 3/2022 | Matov et al. | |
| 11,273,011 B2 | 3/2022 | Shanjani et al. | |
| 11,331,166 B2 | 5/2022 | Morton et al. | |
| 11,344,385 B2 | 5/2022 | Morton et al. | |
| 11,471,253 B2 | 10/2022 | Venkatasanthanam et al. | |
| 11,497,586 B2 | 11/2022 | Kopelman | |
| 11,504,214 B2 | 11/2022 | Wu et al. | |
| 11,534,268 B2 | 12/2022 | Li et al. | |
| 11,554,000 B2 | 1/2023 | Webber | |
| 11,571,278 B2 | 2/2023 | Kopelman et al. | |
| 11,571,279 B2 | 2/2023 | Wang et al. | |
| 11,576,752 B2 | 2/2023 | Morton et al. | |
| 11,596,502 B2 | 3/2023 | Webber et al. | |
| 11,622,836 B2 | 4/2023 | Shojaei et al. | |
| 11,642,194 B2 | 5/2023 | Boronkay et al. | |
| 11,666,415 B2 | 6/2023 | Wang et al. | |
| 11,701,203 B2 | 7/2023 | Makarenkova et al. | |
| 11,723,748 B2 | 8/2023 | Li et al. | |
| 11,779,437 B2 | 10/2023 | Cam et al. | |
| 11,931,222 B2 | 3/2024 | Webber et al. | |
| 11,937,991 B2 | 3/2024 | Webber et al. | |
| 11,969,311 B2 | 4/2024 | Webber et al. | |
| 11,974,896 B2 * | 5/2024 | Kuo | A61C 7/002 |
| 11,980,523 B2 | 5/2024 | Morton et al. | |
| 12,016,748 B2 | 6/2024 | Nishimuta et al. | |
| 12,076,208 B2 | 9/2024 | Sato et al. | |
| 12,144,704 B2 | 11/2024 | Cam et al. | |
| 12,226,280 B2 | 2/2025 | Kopelman et al. | |
| 2002/0006597 A1 | 1/2002 | Andreiko et al. | |
| 2002/0192617 A1 | 12/2002 | Phan et al. | |
| 2004/0166462 A1 | 8/2004 | Phan et al. | |
| 2004/0166463 A1 | 8/2004 | Wen et al. | |
| 2005/0014105 A1 | 1/2005 | Abolfathi et al. | |
| 2005/0055118 A1 | 3/2005 | Nikolskiy et al. | |
| 2005/0186524 A1 | 8/2005 | Abolfathi et al. | |
| 2005/0244768 A1 | 11/2005 | Taub et al. | |
| 2006/0019218 A1 | 1/2006 | Kuo | |
| 2006/0078840 A1 * | 4/2006 | Robson | A61C 7/08 433/6 |
| 2006/0078841 A1 | 4/2006 | DeSimone et al. | |
| 2006/0115782 A1 | 6/2006 | Li et al. | |
| 2006/0199142 A1 | 9/2006 | Liu et al. | |
| 2006/0234179 A1 | 10/2006 | Wen et al. | |
| 2008/0118882 A1 | 5/2008 | Su | |
| 2008/0160473 A1 | 7/2008 | Li et al. | |
| 2008/0286716 A1 | 11/2008 | Sherwood | |
| 2008/0286717 A1 | 11/2008 | Sherwood | |
| 2009/0280450 A1 | 11/2009 | Kuo | |
| 2010/0055635 A1 | 3/2010 | Kakavand | |
| 2010/0129763 A1 | 5/2010 | Kuo | |
| 2011/0269092 A1 | 11/2011 | Kuo et al. | |
| 2013/0029283 A1 * | 1/2013 | Matty | A61C 7/002 700/98 |
| 2013/0209952 A1 * | 8/2013 | Kuo | A61C 7/12 433/10 |
| 2014/0067334 A1 | 3/2014 | Kuo | |
| 2015/0238282 A1 * | 8/2015 | Kuo | A61C 7/08 433/6 |
| 2020/0188062 A1 | 6/2020 | Kopelman et al. | |
| 2020/0237481 A1 * | 7/2020 | Kuo | A61C 7/002 |
| 2022/0110717 A1 | 4/2022 | Chavez et al. | |
| 2022/0110718 A1 | 4/2022 | Chavez et al. | |
| 2022/0110719 A1 | 4/2022 | Chavez et al. | |
| 2022/0313393 A1 | 10/2022 | Lim et al. | |
| 2022/0370654 A1 | 11/2022 | Ting et al. | |
| 2022/0387141 A1 | 12/2022 | Nishimuta et al. | |
| 2023/0190411 A1 | 6/2023 | Chiu et al. | |
| 2023/0190413 A1 | 6/2023 | Matvienko et al. | |
| 2023/0210636 A1 | 7/2023 | Kopelman et al. | |
| 2023/0210637 A1 | 7/2023 | Wu et al. | |
| 2023/0363861 A1 | 11/2023 | Qin et al. | |
| 2024/0018288 A1 | 1/2024 | Durban et al. | |
| 2024/0033053 A1 | 2/2024 | Garrubba et al. | |
| 2024/0140065 A1 | 5/2024 | Choudhary et al. | |

* cited by examiner

FIG. 8A
TARGET ← START
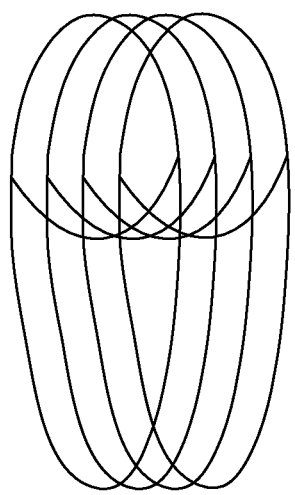
FIG. 8B
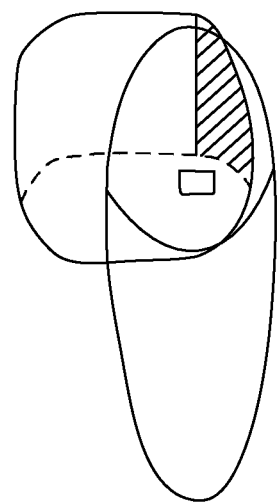
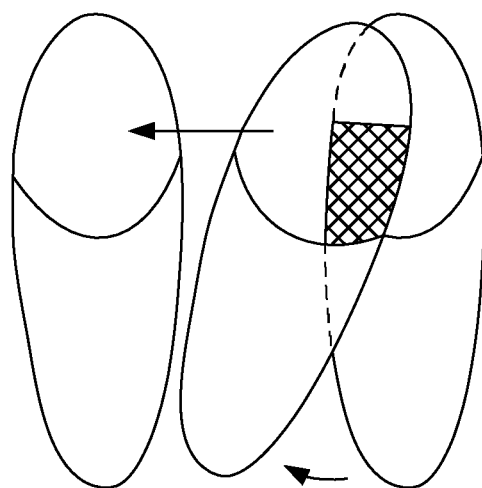
FIG. 9

ORTHODONTIC APPLIANCES THAT ACCOMMODATE INCREMENTAL AND CONTINUOUS TOOTH MOVEMENT, SYSTEMS AND METHODS

CROSS-REFERENCE

This application is a divisional of U.S. patent application Ser. No. 16/852,274, filed Apr. 17, 2020, which is a continuation of U.S. patent application Ser. No. 14/660,375, filed Mar. 17, 2015, now U.S. Pat. No. 10,624,718, issued Apr. 21, 2020, which is a continuation of U.S. patent application Ser. No. 13/692,891, filed Dec. 3, 2012, now U.S. Pat. No. 9,022,781, issued May 5, 2015, which claims the benefit of U.S. Provisional Patent Application No. 61/599,337, filed Feb. 15, 2012, the contents of each of which is incorporated herein by reference in their entirety.

BACKGROUND OF THE INVENTION

The present invention relates generally to the field of orthodontics, and more particularly, to dental positioning aligners or appliances accommodating incremental tooth movements as well as continuous tooth movements with braces (e.g., bracket and wire orthodontics), as well as related methods and systems.

An objective of orthodontics is to move a patient's teeth to positions where function and/or aesthetics are optimized. Traditionally, dental devices such as braces are applied to a patient's teeth by a treating practitioner and the set of braces exerts continual force on the teeth and gradually moves them toward their intended positions. Over time and with a series of clinical visits and adjustments to the braces by the practitioner, the teeth reach their final destination and the appliances are removed. These brackets are affixed to the teeth with a bonding adhesive connecting the base of the bracket to the surface of the teeth.

Alternatives to conventional orthodontic treatment with traditional affixed appliances (e.g., braces) are now available. For example, systems including a series of preformed appliances/aligners have become commercially available from Align Technology, Inc., San Jose, CA, under the tradename Invisalign® System. The Invisalign® System is described in numerous patents and patent applications assigned to Align Technology, Inc. including, for example in U.S. Pat. Nos. 6,450,807, and 5,975,893, as well as on the company's website, which is accessible on the World Wide Web (see, e.g., the URL "invisalign.com"). The Invisalign® System includes designing and/or fabricating multiple, and sometimes all, of the aligners to be worn by the patient before the aligners are delivered to the patient and used to reposition the teeth (i.e., prior to the onset of treatment). Often, designing and planning a customized treatment for a patient makes use of computer-based 3-dimensional planning/design tools, such as proprietary Treat™ and ToothShaper™ developed and used by Align Technology, Inc. Aligner design can be based on computer modeling of a series of planned successive tooth arrangements, and the individual aligners are designed to be worn over the teeth and elastically reposition the teeth to each of the planned tooth arrangements.

While recently developed orthodontic treatment technologies such as those described above represent a considerable advancement in the field of orthodontics, additional advancements remain of interest. Even though Invisalign® aligners can be used for a wide range of orthodontic treatment, in some instances orthodontic treatment making use of a combination of both traditional affixed (e.g., bracket/wire) appliances and shell-type aligners may be desired by a treating professional based on the individual needs/desires of the patient. As such, there is a need for innovative products that provide an orthodontic patient with treatment which includes both traditional affixed (e.g., bracket/wire) appliances and shell-type aligners.

BRIEF SUMMARY OF THE INVENTION

The present invention includes structures and related methods providing a combined use of both traditional bracket/wire devices and shell-type appliances or aligners.

For a fuller understanding of the nature and advantages of the present invention, reference should be made to the ensuing detailed description and accompanying drawings. Other aspects, objects and advantages of the invention will be apparent from the drawings and detailed description that follows.

BRIEF DESCRIPTION OF THE DRAWINGS

FIGS. 8A and 8B show a staged tooth movement and a corresponding portion of an aligner shaped to accommodate the staged movement and apply force, according to an embodiment of the present invention.

FIG. 9 shows non-linear movement of a tooth, according to an embodiment of the present invention.

DETAILED DESCRIPTION OF THE INVENTION

Figure 1:
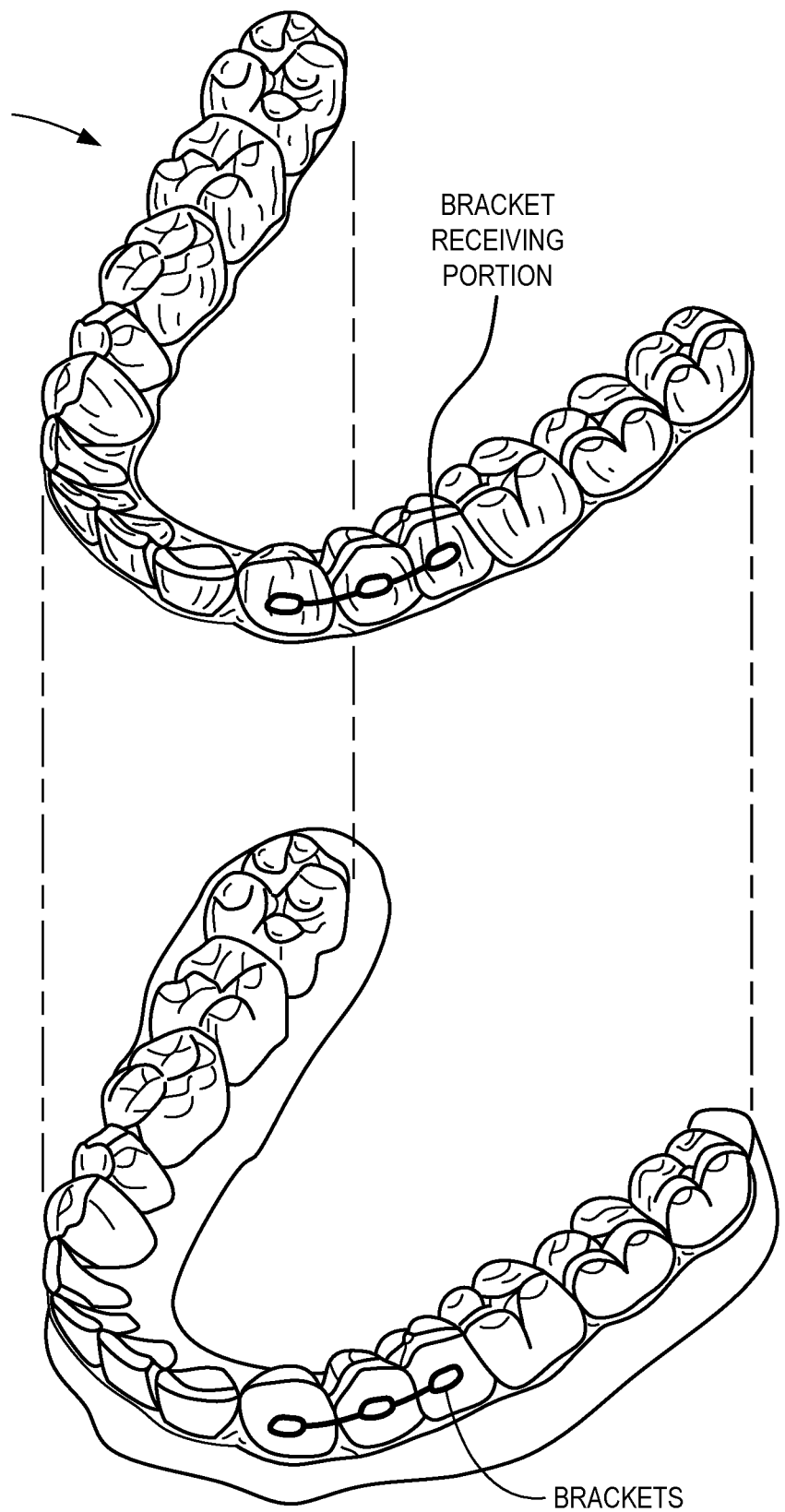
FIG. 1 illustrates an appliance including a braces relief portion and a corresponding jaw of a patient, according to an embodiment of the present invention.

The present invention includes structures and related methods providing combination or dual treatments that use both traditional bracket and wire orthodontics/braces, as well as more newly-developed shell-type appliances or aligners.

A discussion of shell-type appliances or aligners provides an appropriate starting point in a discussion of the present invention with respect to tooth repositioning appliances designed to accommodate a wire and bracket system for a combined shell appliance and wire/bracket system for repositioning teeth. A tooth repositioning shell-type appliance can be worn by a patient in order to achieve an incremental repositioning of individual teeth in the jaw. The appliance can include a shell (e.g., polymeric shell) having teeth-receiving cavities that receive and resiliently reposition the teeth. In one embodiment, a polymeric appliance can be formed from a known thin sheet of suitable elastomeric polymeric material, such a 0.03 inch thermoformable dental material by Tru-Tain Plastics, Rochester, Minnesota. An appliance can fit over all teeth present in an upper or lower arch, or over less than all of the teeth. In some cases, only certain teeth received by an appliance will be repositioned by the appliance (e.g., certain teeth covered by the appliance will receive orthodontic forces) while other teeth can provide a support or anchor region for holding the appliance in place as the other portions of the appliance apply force against the tooth or teeth targeted for repositioning. In some cases, many or most, and even all, of the teeth will be repositioned at some point during treatment depending on the aligner configuration at the time. Teeth that are moved at one point during treatment (e.g., moved teeth) can also serve as a support or anchor for holding the appliance and vice versa, throughout the course of the appliances being worn by the patient. In a series of appliances, some appliances may engage the teeth without the need for supplemental assistance for appliance retention, but in some cases, it may be desirable or necessary to provide individual anchors bonded on the teeth with corresponding receptacles or pockets in the appliance so that the appliance can apply a specific force on the tooth. Exemplary appliances, including those utilized in the Invisalign® System, are described in numerous patents and patent applications assigned to Align Technology, Inc. including, for example in U.S. Pat. Nos. 6,450,807, and 5,975,893, as well as on the company's website, which is accessible on the World Wide Web (see, e.g., the URL "www.invisalign.com").

An appliance can be designed and/or provided as part of a set or plurality of appliances. In such an embodiment, each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment, which may include where dental surgery is prescribed (e.g. tooth extractions), where interproximal reduction (IPR) or tooth reshaping for the creation of space is needed, when a progress check is needed, where spaces are needed for post-orthodontic dental restorations, where anchor placement on the tooth surface is optimal, where the aligner trim line should be located, etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages. The aligner appliances can be generated all at the same time or in sets or batches. The patient wears each appliance for a fixed length of time as instructed by their prescribing doctor, typically 20-22 hours a day, and from 10-21 days for each appliance. A plurality of a series of different appliances, with each upper and lower jaw pair being a "set" in the series, can be designed and fabricated prior to the patient wearing any appliance of the series. After wearing an appliance in the set for an appropriate period of time, the patient replaces the current appliance(s) with the next appliance(s) in the series until the appliances in the series have been worn. Additional series of appliances may be fabricated and worn until a satisfactory treatment outcome is achieved. Unlike orthodontic brackets which are directly bonded to the teeth, the aligner appliances can be removed by the patient throughout the treatment process (e.g., during eating, brushing, etc.).

Bonded orthodontic braces move the teeth as a result of orthodontic force (pressure) delivered to the teeth via an orthodontic wire which is connected to the brackets. The wire is elastically deformed when it is tied to the braces, and as the wire tries to return back to its original shape, the teeth which are connected to the wire are pushed or pulled by the wire as it reconfigures itself from the distorted position back to its relaxed position. Sometimes springs or rubber bands are used to put force in a more specific direction. For example, springs placed on an archwire can help push apart or bring together teeth along the archwire. Rubber bands can help coordinate the upper and lower jaw by pulling teeth in one jaw against teeth in the other jaw. Fixed braces tend to apply a more continuous pressure whereas aligners apply incremental or interrupted forces because of their removable nature.

Some embodiments of the present invention include one or more shell-type aligners or appliances that accommodate braces (brackets and wire(s)) positioned on the patient's teeth to allow for simultaneous treatment with braces and shell-type aligners. Such appliances will typically engage certain teeth so as to apply a repositioning force to those teeth, as well as accommodate teeth to have braces (brackets and wire(s)) coupled simultaneously therewith. Systems and methods described herein can include a single aligner or a plurality or series of aligners—e.g., a plurality of aligners designed to be sequentially worn by a patient.

FIG. 1 illustrates an appliance that accommodates braces positioned on the patient's teeth. A jaw of the patient is shown having braces bonded to several teeth. The tooth repositioning appliance can include an appliance as described above and further modified or configured to accommodate the braces positioned on the patient's teeth. The appliance can be worn by the patient in order to achieve incremental positioning of individual teeth in the jaw. The appliance includes a shell having teeth-receiving cavities that receive teeth and apply a resilient force to one or more of the teeth received. The appliance shell further includes a braces or bracket receiving portion that accommodates the positioned braces. Accommodation can be defined as cutouts in the aligner which border around the braces or component thereof (e.g., bracket, wire, etc.), or a covering (partial or full) over the braces or component in such a way that the aligner can be placed and removed without dislodging the brackets. As described further herein, the braces or bracket receiving portion of the appliance will typically include a movement path volume or geometry configured to receive the braces and accommodate a certain range of movement of the bracketed teeth during orthodontic treatment or a particular phase thereof.

As used herein, the term "braces" generally refers to one or more components of a bonded orthodontic braces appliance configured to retain or move teeth as a result of orthodontic force(s) delivered to brackets positioned on the patient's teeth. A braces component can include bracket(s), wire(s), elastic(s), ligature(s) and the like. A relief portion (e.g., braces or bracket relief portion) of an appliance can be configured to accommodate one or more components of an orthodontic braces appliance, e.g., as described further herein. A bracketed tooth, as used herein, refers to a tooth of the patient having a bracket or braces appliance positioned therein. Thus, a bracketed tooth may include a positioned bracket only, or a positioned bracket and one or more additional components of a braces appliance.

One attempt to accommodate bracketed teeth in a shell type aligner may include aligners manually trimmed by the doctor to remove aligner material that might otherwise cover the brackets and/or tooth areas where the brackets and wires are positioned or to be positioned. Problems typically arise with such an approach, however, due to a lack of sufficient coordination between the aligners delivering fixed increments of tooth movement, and the braces delivering continuous, undefined movements. As a result, a problem of aligner fit can become an issue as a result of the asynchronous coordination between the expected tooth movement built into the aligners and the actual tooth movement accomplished by the braces. In other words, the braces may not move the teeth sufficiently to the next pre-defined increment defined within the aligner shell by the time the patient changes the aligners, or if the braces move the teeth beyond the pre-defined increment by the time of the next aligner change. Such decoupling between the movement elicited by the aligner and the movement elicited by the braces can result in a non-fitting or ineffective shell appliance that no longer works for the patient. Cutting away of aligner material can also weaken the aligner structure and may minimize or eliminate the desired effect on the tooth/teeth to be moved.

A challenge, therefore, is to create a system that allows for incremental (e.g., pre-programmed aligner-elicited movement) as well as continuous (e.g., braces elicited movement) tooth movements concurrently or simultaneously. One approach is to plan or predict the movements from both system components and design aligners precisely to fit and deliver tooth movement at identified stages or phases of treatment based on known biological tooth movement rates published in the scientific literature. For example, one may try to predict the rate of tooth movement that can be achieved with different bracket and wire systems. Since the rate of tooth movement with braces depends on a number of variables, including but not limited to the type of wire material used (e.g. stainless steel vs. nickel titanium), the size of the wire used (e.g. 0.014 inch, 0.018 inch), the shape of wire used (square vs. round), the age of the patient, the gender of the patient, the size of the tooth root, the bone level around the tooth, the type of bone (maxillary or mandibular; maxillary has better blood circulation), and whether certain medications may be taken prior to and/or during treatment (e.g., anti-inflammatory drugs, bisphosphonates).

Another approach includes identifying a movement scenario that builds into an aligner a space or relief that accommodates a fixed increment of tooth movement with or without a margin for deviation. For example, an aligner may be built so as to accommodate an increment of movement that exceeds the most likely scenario of tooth movement for the braces portion (which could be based on rates published in the scientific literature for example) and including an additional space that allows certain teeth (the bracketed teeth) to freely move from the current positions to the maximum likely tooth movement positions. This prevents the aligners from interfering with the tooth movement and prevents the teeth with the braces from preventing aligner seating. The most extreme version of this approach would be to accommodate the bracketed teeth from the beginning position all the way to the end position. In this extreme scenario however, the aligner portion covering the bracketed teeth may be loose and uncomfortable for the patient, especially if the distance for the tooth to travel is large. Furthermore, an even greater deviation may be needed as an accommodation if the actual path of the tooth requires a non-linear deviation from the beginning to end position. For this reason, and also to accommodate such non-linear paths of teeth and/or different tooth movement timing sequences (e.g., canines being retracted first, then the anterior teeth later), having a limited range of possible movements from the current position is a better alternative than encompassing the entire planned path for each tooth being bracketed.

Figure 2A:
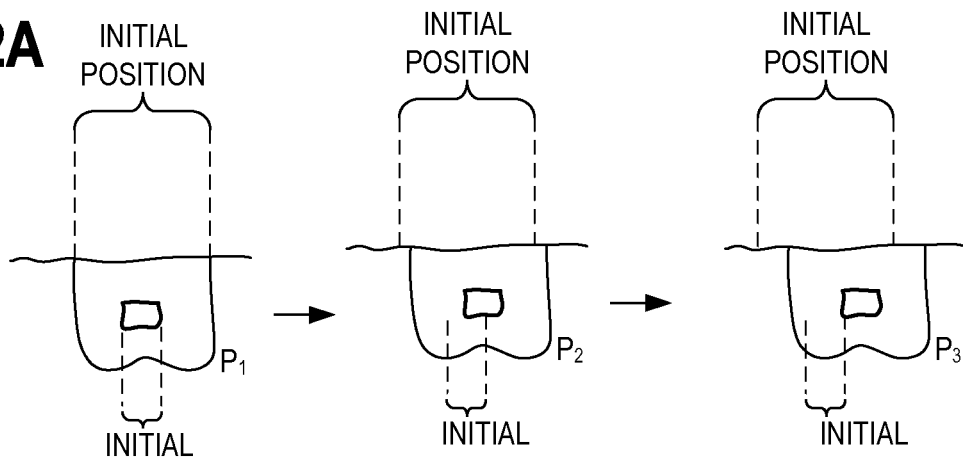
FIG. 2A through 2C illustrate tooth movement between an initial position and subsequent positions (FIG. 2A); tooth and bracket location in illustrated positions; and an aligner relief portion accommodating bracketed tooth movement between illustrated positions.
Figure 2B:
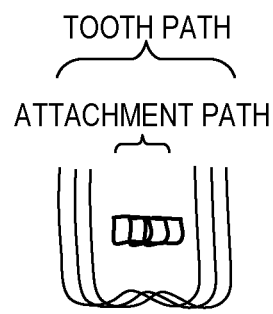
Figure 2C:
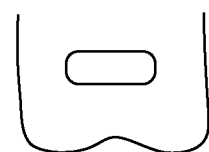

In one embodiment, the braces portion of the aligner (the part which accommodates the teeth with the braces bonded to them) can include a tooth movement path volume or geometry determined based on identified or predicted movement of a tooth or teeth between two or more positions. Identifying a tooth movement path and the corresponding volume or geometry of a bracketed tooth moving along the path digitally or by computer and designing a corresponding aligner to accommodate the movement path volume or geometry is illustrated with reference to FIGS. 2A-2C. One or more of various types of tooth movements may be accomplished, including but not limited to, inclination, angulation, translation, rotation, intrusion, extrusion, or combinations thereof and eliciting a tooth movement. The present invention will not be limited to any particular movement or movement type. For illustrative purposes, FIG. 2A diagrams a simplified tooth movement (translation) between positions $P_1$, $P_2$, and $P_3$. FIG. 2A shows a tooth at position $P_1$ with dashed lines providing a reference point for tooth and bracket positioning at the "initial position." As the tooth moves to $P_2$, both the tooth and the bracket are shifted right relative to the initial tooth and bracket positions as in $P_1$. Further movement of the tooth to $P_3$ further shifts tooth and bracket positioning relative to the initial position of the tooth and bracket. FIG. 2B shows tooth and bracket positions at $P_1$ through $P_3$ overlaid to illustrate the movement path volume or geometry (the geometric summation of the incremental tooth movement as the increment of movement approaches zero from initial to target position) of the tooth with its bonded bracket. The movement path may include and be defined by a plurality of staged tooth positions as described and may further include interpolation of tooth positions between particular identified or digitally represented tooth stages or positions. FIG. 2C illustrates an aligner portion having a movement path volume or geometry based on predicted or computed movement of the tooth and bracket between $P_1$ through $P_3$. The aligner includes a tooth receiving cavity having a volume and geometry shaped to accommodate a path of movement of the tooth between $P_1$ through $P_3$. The aligner further includes a relief portion, e.g., braces-receiving relief portion, having a volume and geometry shaped to accommodate a path of movement of the bracketed tooth between $P_1$ through $P_3$.

Figure 3:
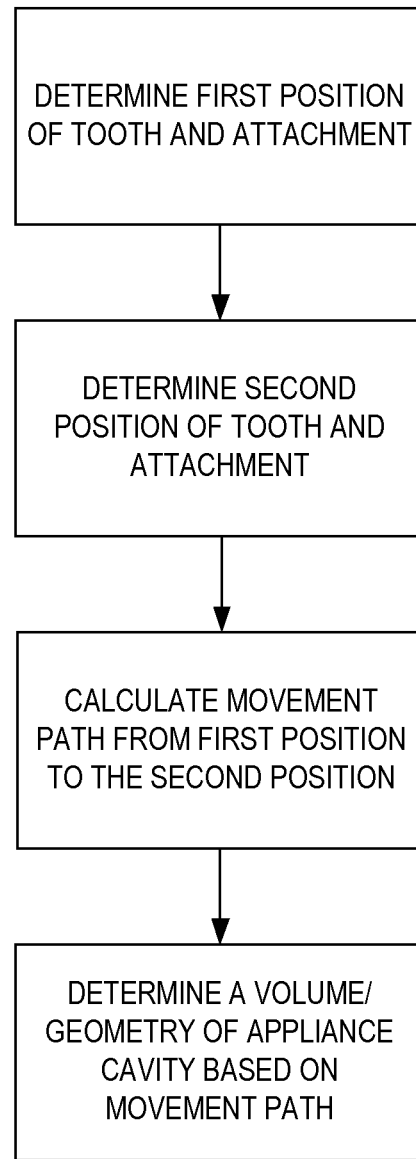
FIG. 3 illustrates a method according to an embodiment of the present invention.

FIG. 3 is a flowchart illustrating steps of a method, such as a computer-implemented method, for providing an aligner accommodating a braces-elicited movement of one or more bracketed teeth. A method includes determining a first position of a bracketed tooth. Next, is a determination of a second position of the bracketed tooth. Thereafter, the movement path from the first position to the second position is determined or calculated. Next, a movement path volume or geometry is determined based on the first and second positions and the movement path of the bracketed tooth. An appliance is designed and/or fabricated including a portion or relief in the appliance cavity configured with a volume or geometry to accommodate movement of the bracketed tooth according to the calculated movement.

Figure 4A:
FIGS. 4A through 4D illustrate aligners including a tooth receiving cavity and braces relief portion according to embodiments of the present invention.
Figure 4B:

As discussed above, various aligner shapes and/or designs can be selected for use in a combined aligner and braces system as described herein, and aligners will not necessarily be limited to any particular shape, geometry or design. As discussed above, an aligner can include a receiving portion or relief shaped to accommodate positioned bracket or braces. Various suitable shapes and/or designs can be accomplished according to the systems and methods described herein. Certain non-limiting examples of aligner shapes or designs are provided with reference to FIGS. 4A through 4D. FIG. 4A shows a cross-section view of an example aligner portion shaped to accommodate braces/bracketed teeth, where the aligner wall extends outward laterally from the bracketed tooth surfaces to form a relief portion. FIG. 4B is another example of an aligner portion shaped to accommodate braces/bracketed teeth, where the aligner wall extends outward to form a non-uniformly shaped relief portion.

Figure 4C:
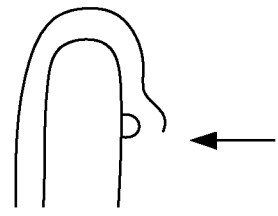
Figure 4D:
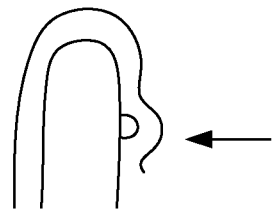

An aligner or relief portion thereof can be shaped or designed to facilitate placement of the aligner on the patient's teeth (bracketed teeth), while minimizing unwanted contact between the aligner and braces. For example, the aligner relief portion may be shaped to minimize contact between the aligner and braces that might make placement of the aligner over teeth difficult or potentially damaging to the aligner and/or braces structure. FIG. 4C shows a cross-section side view of an aligner positioned over a tooth having a bracket attached. The side of the aligner extending over the bracket has a shortened side wall that extends less than the entire distance of the tooth crown portion, or less than the entire distance between the occlusal portion of the tooth and gingival line or edge. FIG. 4D is a side view showing an aligner positioned over a bracketed tooth, where the relief portion having a distal portion or portion extending in a gingival direction and flared laterally so as to minimize an edge of the aligner catching or butting against the bracket during aligner insertion and removal.

The aligner or relief portion thereof can include various shapes or designs, and may include, for example, a protrusion, bubble, envelope, slot shape and the like. The relief portion may be defined by a continuous or substantially continuous portion of the aligner or material or may be composed at least partially or wholly of one or more materials different from material(s) forming other parts of the aligner. In some instances, a relief portion may form an open portion, so as to form a hole, window, annulus, and the like. A relief portion may include or define an insertion path (e.g., a passive insertion path) to receive the braces/bracketed tooth so the aligner avoids contacting or clipping the attachment structure (e.g., bracket, wire, elastic, elastic chain, springs, etc.). Thus, as discussed further herein, the relief portion can be designed to reduce or minimize unwanted contact that might disrupt or damage the bracket positioned on a tooth, or otherwise disrupting a braces component.

Figure 5A:
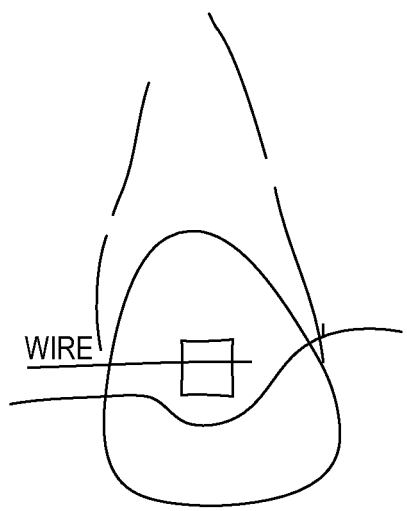
FIGS. 5A through 5D show aligners including a tooth receiving cavity and braces relief portion according to embodiments of the present invention.
Figure 5B:
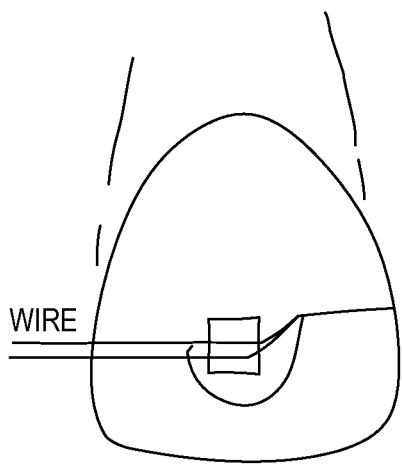
Figure 5C:
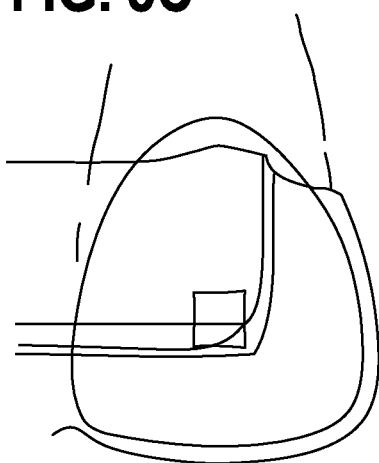
Figure 5D:
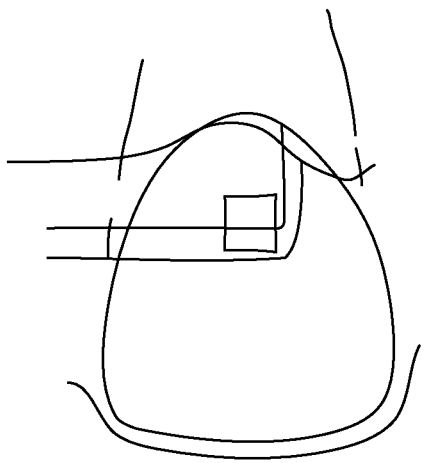

Further non-limiting examples of aligner shapes or designs are provided with reference to FIGS. 5A through 5D. Each of the illustrated examples show an aligner having a tooth receiving cavity and a braces relief portion, the cavity and relief having a structure or geometry shaped to accommodate movement of a braces/bracketed tooth along a movement path as described herein. FIG. 5A shows an aligner having a tooth receiving cavity with a relief portion, where the relief portion includes a portion of the aligner that is open to the braces, e.g., forming a cut-out or cut-away, such that the braces are not substantially received within the cavity or relief portion. FIG. 5B shows an aligner having a tooth receiving cavity and a relief portion that at least partially receives the bracket/braces as the aligner is positioned on the patient's teeth. The relief potion forms a bubble or envelope that extends out laterally relative to the adjacent portions of the aligner or adjacent surface of a tooth received in the aligner cavity. As shown, the relief portion is shaped such that the bracket is at least partially disposed within the relief portion, and the wire remains at least partially outside the relief portion. FIG. 5C shows an aligner having a tooth receiving cavity and a relief portion, where the relief portion defines an envelope or channel shaped to accommodate a received bracket and wire. The envelope extends both laterally and vertically (i.e., along a long axis of the tooth). The envelope can include a portion that extends or protrudes further outward compared to an adjacent portion of the envelope, so as to more easily receive and accommodate bracket positioning as the aligner is positioned or removed from the patient's teeth. FIG. 5D shows an aligner having a tooth receiving cavity and a relief portion, where the relief portion defines an envelope or channel shaped to accommodate a received bracket and wire positioned more gingivally on the tooth.

Various types of movements and positioning of the teeth may be accommodated according to the methods and techniques described herein. Movement between two or more positions can include initial, intermediate, and/or final position of the teeth per overall treatment or a phase of treatment. In one embodiment, the braces-receiving relief portion of the aligner between an initial position to a target position includes an intermediate position before reaching the final desired goal position. The defined path of the tooth and its bracket do not need to follow a linear path. See, e.g., FIG. 9.

In another embodiment, the braces accommodating or relief portion of an aligner includes a movement path volume or geometry which accommodates a selected range of tooth movement (e.g., maximum possible tooth movement) in a selected increment of time that the aligner is to be worn. For example, if teeth would not be reasonably expected or predicted to move more than 1 mm in one month, than a +1 mm envelope of movement programmed into an aligner that is to be worn for 2 weeks would adequately contain enough space for the teeth with the braces to move freely.

In another embodiment, the braces accommodating or relief portion of an aligner includes a shape, or volume or geometry, which accommodates a selected range of tooth movement, where the range of movement is based on an identified or predicted movement further including a sort of "error margin" or buffer distance for less movement and greater movement than that identified or predicted. For example, the braces portion contains movement ahead as well as behind according to a fixed interval (the increment itself does not necessarily have to be symmetric, meaning the forward increment can be greater than the backward increment or vice versa), to account for the possibility that the teeth with the braces might not be caught up to expected positioning, as well as to account for the possibility that some or all of the bracketed teeth may move more rapidly than expected at any particular stage. In other words, if the teeth are at a position time point T, then the braces portion might be T+X and T−X if the increment of cushion is the same, or T+X and T−Y if the buffer increment are not the same (e.g., a buffer of 4 weeks of anticipated movement forward, and the position of the teeth 2 weeks prior to the anticipated target). A potential advantage of the forward (and "backward")-looking fixed increment of time (or corresponding movement) is that variants in staging pattern such as canine-retraction first and non-simultaneous selective movements can be built into the treatment plan without creating a large bubble in the aligner, which may be the case if the entire path from before to after is built into the sectional region for the braces. By not creating a large bubble, the aligner is better retained to the teeth and the chance of tissue irritation from the cheeks and lips being trapped underneath the aligner is reduced.

In another embodiment, an aligner braces/bracket relief portion may be configured such that certain directions of tooth movement are enabled whereas certain directions are restricted. For example, the vertical position of the teeth (extrusion) may be restricted to prevent the teeth from erupting early in the treatment, whereas the rotations and translations may be unrestricted. This allows certain types of movements to be restrained from taking place for the purpose of better dimensional control and the reduction of undesired side-effects, such as with vertical extrusion of molars for example. An aligner may be configured such that a relief portion accommodates or restricts a particular range of movement within a given direction or movement vector. See, e.g., FIGS. 6 and 7.

An aligner as described herein can be configured such that a target or final position of a tooth accommodated by an aligner's braces/bracket relief portion or section reflects tooth movement or an end point that the braces with the wire will accomplish. In a braces-elicited tooth movement, the tooth position is governed by the position of the braces on the teeth as well as the prescription built into the bracket, which the wire will move the teeth to as the wire straightens out from the initial active "bent" position when the wire is engaged in the brackets to the relaxed or passive position. Therefore, setting up the target position of the teeth with the likely position of the teeth given the prescription of the brackets may be important to the accuracy of the fit of the aligner throughout treatment. During the setup process, a simulation of the actual bracket and intended final wire arch form may be used to establish the goal or target position of the teeth to which brackets will be bonded. Otherwise the wire will move the teeth with the brackets towards a goal programmed into the bracket, but the aligners may try to move the teeth towards a different goal, and this mismatch will either lead to a poor fit of the teeth with the aligner, or the teeth will be constantly jiggled back and forth between the two positions when the aligners are taken on and off, and the braces are free of the aligner constraints while the aligners are not being worn.

The number of brackets positioned on teeth and/or accommodated by an aligner as described herein can vary and is not limited to any particular number of brackets and wires. As the minimum number of brackets that can be connected by a section of arch wire is two brackets in an arch, aligners as described herein will typically accommodate two or more brackets. Brackets can be positioned through various manners, including manually or digitally, and directly or indirectly, using any number of bracket-positioning systems.

A process or mechanism for bonding the brackets can be any number of techniques or technologies, including but not limited to indirect bonding trays where brackets are included (e.g., Cadent iQ), placement jigs (e.g., Insignia, Incognito lingual), and/or bracket placement guides (Align's bracket positioning template). Orthodontic bracket positioning may make use of one or more bracket positioning templates, including templates such as those described, e.g., in U.S. Pat. No. 7,658,610.

Techniques may be employed to ensure that the final position of the teeth built into the aligner is based on the position of the teeth that the bracket will move the teeth to when the wire is fully expressed. For a section or span of teeth (i.e., two or more teeth adjacent to each other), the position of the teeth relative to each other is important and may be more relevant compared to the absolute position of the section relative to the jaw. This is because the braces section only aligns the teeth with the brackets relative to each other. The entire unit of the sectional fixed appliances will be positioned relative to the teeth being moved by the aligners, based on the orientation of the braces section relative to the non-bracketed section in the aligner.

As will be recognized, aligners as described herein can include various geometries or configurations can be selected or designed for use as disclosed. Aligners can be shaped or designed to accommodate one or more of the following functionalities: retention of tooth/teeth positioning, prevention of a particular movement or movement type of a tooth; enhancement of movement or force applied to a tooth/teeth due to bracket placement and wearing braces (i.e., the aligner can assist in the movement of the bracketed teeth rather than be passive in those regions of the appliance); facilitating guidance of a tooth or teeth along a particular tooth movement path; protection of certain tissues (e.g., tongue, cheeks, lips) from bracket contact or irritation.

For example, in some instances, the doctor may prescribe that movement of one or more teeth is not desired during treatment or during a particular phase of treatment. An aligner of the present invention can be selected or designed such that the corresponding tooth receiving cavity of the aligner is shaped to facilitate retention of the tooth in a particular position in order to maintain the current position of the tooth. One example is where a tooth or teeth are utilized as an anchor position, either bracketed or unbracketed, so as to facilitate the application of a movement force to the other teeth of the patient's dentition. Such an aligner can be shaped to facilitate retention of the anchor tooth/teeth in the desired position during treatment. In another example, a particular tooth or teeth may have been moved at an earlier stage of treatment and it is desired that said teeth be held or maintained in their current positions. An aligner can be shaped or designed to facilitate retention of the tooth in the current or target positioning while additional orthodontic treatment (e.g., further movement) takes place either simultaneously or sequentially (e.g., movement primarily by braces then aligners then braces or movement primarily by aligners then braces).

In another example, and in furtherance of discussion herein, an aligner can be shaped or designed so as to facilitate prevention of tooth movement in a particular manner and/or to guide tooth movement in a desired direction or path of movement. An aligner or portion thereof designated as a relief portion can be configured such that certain movement vectors or paths (including non-linear ones) of movement are enabled whereas certain movements are restricted. In this manner, aligners can be designed or selected so as to enable better dimensional control or "fine-tuned" movement of teeth with treatment.

Figure 6A:
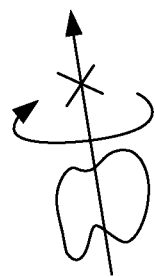
FIGS. 6A and 6B conceptually illustrates building an aligner restricting tooth extrusion but allowing tooth rotation, according to an embodiment of the present invention.
Figure 6B:
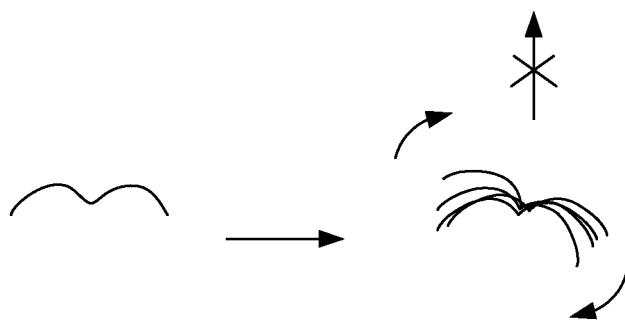

FIG. 6 illustrates restriction of posterior tooth extrusion but allowing tooth rotation as an example of aligner design where certain movement vectors or paths of movement are enabled whereas certain movements are restricted. FIG. 6A illustrates a tooth where the desired movement is illustrated with the curved arrow showing a desired rotational movement, and a vertical arrow showing the desired restriction of movement along a vertical movement vector or path (e.g., restrict or prevent extrusion movement of the tooth). FIG. 6B shows conceptual design and shaping of an aligner crown portion. A 2D cross-section of a crown portion of a tooth is shown. As the tooth is moved from a first position to subsequent positions to accommodate the rotational movement, corresponding staged 2D cross-sections are superimposed to illustrate a tooth movement path as the tooth rotates. The staged 2D cross-sections define a tooth movement path where tooth rotation is permitted, but lateral extrusion movement of the tooth is restricted or blocked by the crown portion of the aligner cavity. In computer aided design, such movement can be enabled by filtering certain directional vectors in a computer-implemented treatment planning or staging program.

Figure 7A:
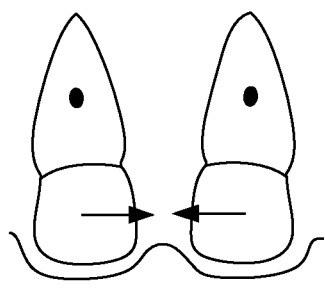
FIGS. 7A through 7D illustrate tooth movement and building an aligner restricting tooth extrusion but allowing tooth translation, according to an embodiment of the present invention.
Figure 7B:
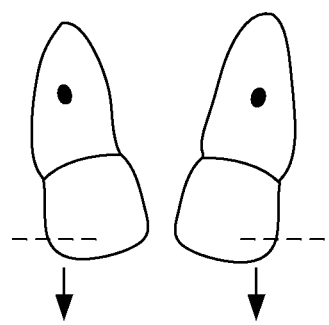
Figure 7C:
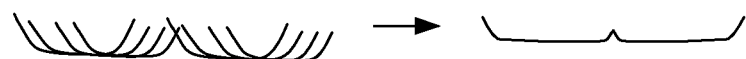
Figure 7D:
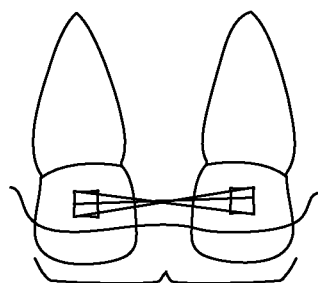

FIG. 7A through 7D illustrates restriction of upper anterior extrusion while allowing for translation, e.g., for space closure, as another example of aligner design where certain movement vectors or paths of movement are enabled whereas certain movements are restricted. FIG. 7A shows teeth received in an aligner where translation movement is desired for space closure. FIG. 7B illustrates undesired anterior extrusion that might result from force application to the tooth crowns without restriction of the vertical movement component. As a force is applied laterally to the tooth, the applied force may elicit tooth translation but also may elicit tipping or rotation around a center of rotation of the tooth with an extrusion or vertical movement component. FIG. 7C shows 2D cross-sections of aligner crown portions for a series of movement stages to illustrate a movement path, and further illustrates removal of intermediate stages such that the aligner crown portion is shaped to accommodate the movement path of the tooth. The crown portion is shaped to allow movement of the teeth along the movement path while restricting vertical movement so as to restrict tooth extrusion. FIG. 7D shows teeth having braces, where the teeth are positioned in an aligner having a cavity shaped to accommodate movement of the teeth along a translation movement path allowing for space closure. As movement forces are applied to the teeth, the aligner cavity accommodates translational movement while restricting tooth extrusion.

In yet another embodiment, an aligner or portion thereof can be designed or shaped to work in conjunction with braces-elicited movement such that the movement force(s) applied to the teeth via braces are facilitated or further enhanced. In one example, a movement is elicited to a tooth (or plurality of teeth) that is the net result of action by both an aligner and braces. This may occur where both the aligner and the braces impart movement forces to the tooth, with the system of forces combined to elicit a particular movement to the tooth. In another example, one of the braces or the aligner may contact the tooth and act as a leverage point or point of resistance to the tooth that affects the movement force applied by the other orthodontic component. With such dual use, treatment may be enhanced so as to allow improved movements (e.g., better translation, reduced tipping, etc.) than might be accomplished using braces alone. Treatment time may also be shorter because in some instances, for example, the teeth surfaces may only be accessible for movement to be accomplished by one mechanism (aligners) but not the other (brackets, in the case of severe rotation or deep bite). See, e.g., FIG. 13.

FIGS. 8A and 8B show a staged tooth movement and a corresponding portion of an aligner shaped to accommodate the staged movement and additionally apply a force to the tooth in conjunction with worn braces. FIG. 8A shows staged tooth movements between sequential positions (e.g., $P_1$ through $P_4$)—for example, a first position (e.g., start position) and a subsequent position (e.g., target position), with intermediate positions there between. FIG. 8B shows an aligner with a cavity portion positioned relative to the tooth in the first position of FIG. 8A. The aligner includes a tooth-receiving cavity portion that is shaped to at least partially accommodate the tooth movement path geometry or volume. The tooth-receiving cavity further incudes a relief portion, which may be shaped to accommodate movement of the braces throughout the entire tooth movement, e.g., as shown in FIG. 8A. The aligner cavity portion is shaped so as to apply a resilient force to the tooth during only a portion of the movement path. For example, when the aligner is positioned over the patient's teeth, the aligner may stretch to accommodate the tooth in the first position, thereby applying a resilient force due to elastic deformation of the aligner material. The aligner cavity includes an active portion that contacts the tooth for application of the movement force applied by the aligner. The aligner may be shaped such that the aligner reaches a non-deformed or relaxed state as the tooth reaches an intermediate position but prior to the tooth moving to the target position. Furthermore, the geometry of the tooth receiving cavity may be selected or shaped to guide tooth movement along the defined movement path and/or restrict one or movements or directions of the tooth.

A tooth movement may include moving a tooth linearally or non-linearlly along a tooth movement path. Referring to FIG. 9, a non-linear movement path, e.g., to enhance the applied force in the mesio-cervical area is shown. Braces may be applied to the teeth such that more of a crown movement force might be elicited with braces alone. An aligner can be configured to further or additionally apply a root-moving force to the tooth and for application to the teeth in conjunction with the braces. The combination of the braces and the aligner, in such an instance, can be selected to provide a desired net movement (crown+root) to the tooth.

Designing a system for combined aligner and braces movement forces applied to the tooth may have the advantage of allowing a selection of brackets (e.g., bracket shapes, types, materials, ancillaries including hooks, brands, designs, etc., including banding) or bracket location/positioning on a tooth that might not otherwise be selected or available to a treating professional for delivery of the same tooth movement when only fixed braces alone are used. With regard to bracket positioning, for example, when using braces alone for treatment, a bracket is typically positioned on a tooth in a conventional manner at a prescribed position on the tooth (usually a middle crown point or the FA point if on the facial surface) to allow maximum accuracy and efficiency when eliciting the desired movement. Thus, alternate positioning is generally unavailable, thereby restricting the types of movements that might be accomplished, when using braces alone. When using a combined aligner and braces system, a different positioning of the bracket might be selected (e.g., bracket moved more toward the occlusal or gingival direction). A different type of bracket may also be selected (e.g., a more narrower bracket design) if a portion of the movement is planned to be accomplished through the aligner and not entirely by the wire. In one example, the positioning of one or more brackets might be modified so as to position the brackets lower on the tooth (or more gingivally), such that the braces are less visible or allow for improved aesthetics or in order to avoid the opposing teeth in the case of a deep bite, for improved comfort for the patient by positioning the bracket away from sensitive areas, for improved force or torque (e.g., rotational or tipping force), or otherwise accommodating a treatment preference of the practitioner or the patient. In another example, bracket positioning may be altered to accommodate combined aligner/braces treatment so as to allow for improved or altered tooth movements as described above.

Figure 10A:
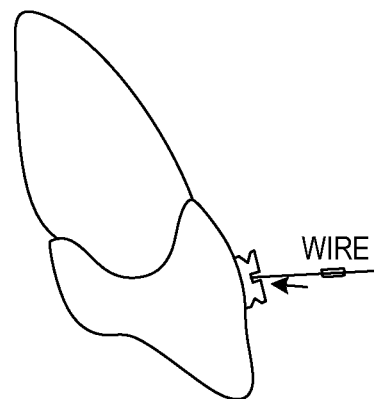
FIGS. 10A through 10C show positioning and selection of brackets and wires, according to an embodiment of the present invention.
Figure 10B:
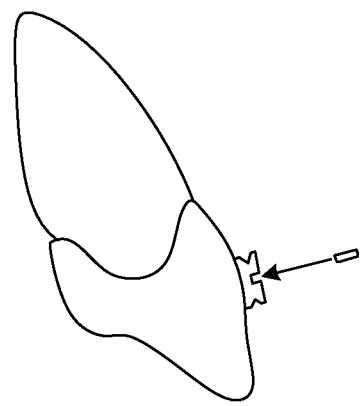
Figure 10C:
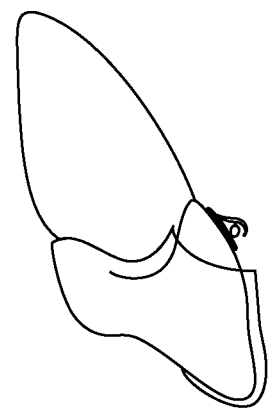

FIGS. 10A through 10C shown positioning of brackets and wires, as well selecting alternate bracket positioning and bracket type/design, for use in combined aligner and braces systems and methods described herein. The position of the bracket on the tooth affects the position of the wire, and therefore affects the movement force applied to the tooth by the braces. Different movement forces and/or positioning of braces can be utilized when using a combination of current aligners and braces compared to use of braces alone. FIG. 10A shows bracket positioning on a tooth so as to accommodate normal facial axis (FA) point insertion position for a straight wire. FIG. 10B shows a modified position of the bracket on the tooth selected to accommodate use of a combined aligner and braces system. The bracket positioning shown in FIG. 10B is at a higher angle of insertion compared to positioning shown in FIG. 10A, and wire insertion is no longer the normal straight wire insertion. Such bracket positioning and wire insertion introduces different movement forces to the tooth (e.g., greater lingual inclination forces on the upper incisors than if inserted parallel to the occlusal plane), and an aligner can be designed to function in conjunction with such forces so as to elicit a desired tooth movement. FIG. 10C shows selection of a lower profile or wire clip type bracket with no inclination (i.e., a bracket that allows rotation and inclination dimension movement and all translations). The aligner includes a tooth-receiving cavity shaped such that the aligner edge is disposed either around or over at least some portion of the bracket to accommodate the bonded bracket while the aligner is being worn. Use of a combined aligner and braces system as described may further allow selection and use of different wires, such as round wire with a low-profile bracket, where the aligner component reduces the minimum necessary force component required from braces in the orthodontic system.

Figure 11A:
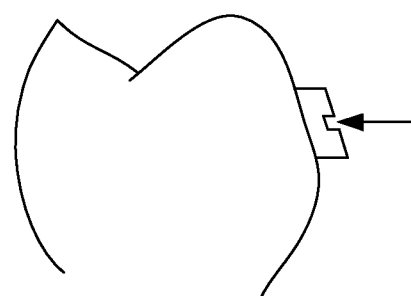
FIGS. 11A through 11C show positioning and selection of brackets and wires, according to an embodiment of the present invention.
Figure 11B:
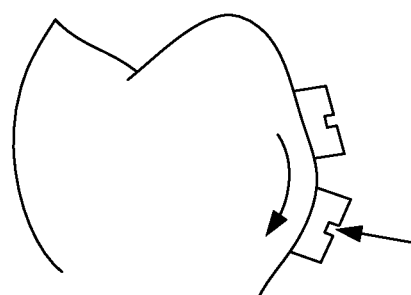
Figure 11C:
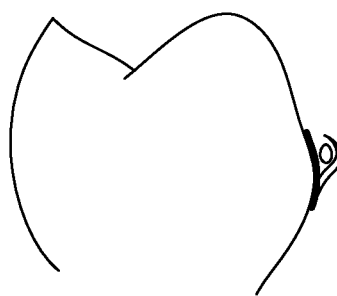

Similarly, FIGS. 11A through 11C shown positioning of brackets on a tooth, including selecting alternate bracket positioning and bracket type/design, for use in combined aligner and braces systems and methods described herein. FIG. 11A show positioning of a bracket on a tooth (e.g., molar) for braces-only treatment, with FIG. 11B showing alternate or modified positioning of the bracket in a combined aligner and braces system. FIG. 11C shows selection of a lower profile or wire clip type bracket with no inclination (e.g., a 2-dimensional bracket), and bracket positioning on the tooth.

Thus, in some embodiments, designing a system for combined aligner and braces treatment may include selection or modification of a component of the braces, such as bracket or wire selection. With regard to brackets, brackets may be selected or shaped specifically to accommodate or even enhance/optimize treatment when used in combination with an aligner system. In other words, the bracket design is specific to address one or more particular weaknesses of the aligner design and the aligner design bolsters the weaknesses of the bracket design. For example, a lower incisor bracket can be designed such that it can be positioned more gingivally to avoid the lingual surfaces of the upper incisors during bite closure, but remain efficient for rotations because of the aligner component which engages the bracketed teeth in the incisal portion where rotational forces are more efficient to administer due to the greater mesial-distal width (in comparison to the incisor width near the gingiva). This removal of duplication efforts between the two components can allow for better appliance esthetics and patient comfort than using a combined off-the-shelf approach. A bracket may include a shape selected or designed to accommodate placement of an aligner on the patient's teeth and/or interaction between the bracket and the aligner. Brackets can be selected with one or more surfaces that contact or even engage a surface of an aligner. In one example, use of a combined aligner/braces system may allow selection of certain bracket shapes/designs that might not otherwise be available for a particular treatment or tooth movement. For example, certain low profile brackets, brackets having a simplified shape, flattened brackets, lingual brackets, so-called 2-dimensional brackets (such as those commercially available, e.g., from Forestadent, GmbH), may be selected for use in a combined aligner/braces system as described herein to accomplish tooth movements or treatments that may not otherwise be available or practical when using the same types of brackets in a braces treatment system alone. Bracket geometry may also be reduced to resemble an aligner attachment, such that it becomes a bracket-attachment hybrid (an attachment with a tube designed to engage an archwire for example). Additionally, particular brackets, such as those mentioned above, may be selected to reduce reduced contact or unwanted interference/contact between a bracket and an aligner surface.

Similar to bracket selection, other orthodontic device components (e.g., archwires, elastics) may be selected based on use of a combined aligner/braces system. For example, a particular archwire (e.g., size, shape, material properties, etc.) may be selected for use in a combined system where that archwire might otherwise be less desirable for a particular treatment or movement when using braces alone. For example, the doctor may be able to remain in a super-elastic nickel-titanium archwire for a longer period of time before switching to stainless steel or remain in a more comfortable smaller dimension archwire longer before stepping up to a thicker wire.

In addition to some potential benefits alluded to above, a combined aligner and braces system as disclosed herein may advantageously reduce or limit contact between braces components, the teeth, and soft tissues (e.g., the tongue, cheeks, lips) of the patient's mouth. For lingual bracket systems, for example, an aligner in a combined system may at least partially cover the brackets and/or reduce irritating contact between the patient's tongue and one or more brackets positioned on the teeth. In another example, the sharp portions of the brackets such as the hooks may be covered by the aligner or even relegated completely to the design of the aligner itself (i.e, the hooks are in the aligner not in the bracket).

Figure 12:
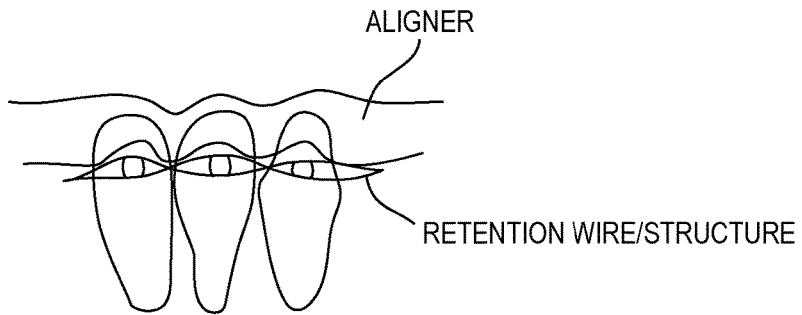
FIG. 12 shows an aligner shaped to accommodate a retention wire structure on a section of a patient's teeth.

As described herein, an aligner can be shaped to accommodate various components of an orthodontic braces structure, including brackets as well as wires and elastics. In traditional orthodontics, a wire retention structure around the braces may be implemented once teeth have moved to a desired position in order to retain the teeth in position for a selected time. In one embodiment, an aligner is shaped to accommodate, or even replace, a retention structure, such as a wire retention structure (e.g., ligature wire structure). FIG. 12 shows an aligner shaped to accommodate a retention wire structure on a section of a patient's teeth. In one embodiment, an aligner can be designed to hold the teeth in the desired position following prior movements and can work in conjunction with a wire retention structure or may be designed to allow the aligner to provide the retention structure alone, thereby allowing removal of the wire retention structure—or replacement of the wire retention structure with an aligner shaped to retain teeth in the desired position. For example, an aligner can be shaped to receive the bracket-positioned teeth and hold the bracketed teeth firmly in place, preventing movement of the teeth or relapse. In such an example, the braces may be left on the teeth without the wire, in case additional tooth movement with a wire is required, but the wire is not needed with ligature wire (for hygiene benefits) because the aligner portion will hold the bracketed teeth in the desired position.

As described above, braces or bracketed teeth will span two or more teeth, and may include two or more bracketed teeth adjacent to each other, as well as one or more unbracketed teeth positioned between bracketed teeth. In some instances, braces may be affixed to a section of two or more teeth where the section includes one or more teeth not having braces/brackets affixed thereto. Such an arrangement may be selected, for example, where one or more teeth within a section of teeth are positioned in a manner where positioning of a bracket is either undesirable or not practical/possible. This may be the case when restored surfaces such as composite, metal or porcelain are present, which can be difficult to bond brackets to, but tooth movement of the tooth/teeth in between is desired. Thus, in one embodiment, a system can include an aligner shaped to accommodate one or more teeth positioned between two braces or bracketed teeth. The aligner can be designed or shaped so as to elicit movement to said unbracketed tooth/teeth while accommodating movement to the adjacent bracketed teeth with a braces appliance. An example of a longer span in this situation would be the movement of anterior teeth restored with porcelain veneers where bonding brackets to the veneered teeth risks damage to the veneers upon removal of the braces.

Figure 13A:
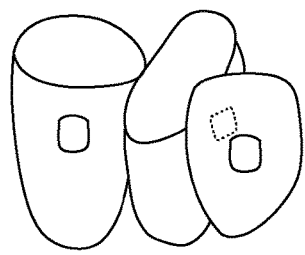
FIGS. 13A and 13B illustrate teeth (FIG. 13A) and teeth and a corresponding aligner (FIG. 13B), according to an embodiment of the present invention.
Figure 13B:
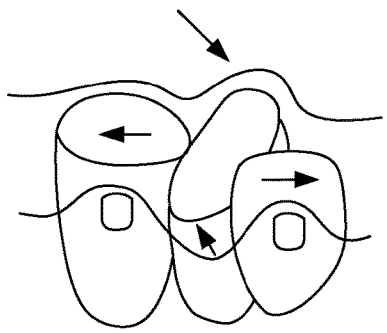

Referring to FIG. 13A, a section of teeth is shown including at least one tooth positioned between two teeth having brackets attached thereto. In one example, movement of the middle tooth may be desired even though placement of a bracket on that tooth is impractical due to relative positioning of the teeth (e.g., severe crowding leading to a tooth being blocked from access for bracket bonding), desired movement that might be impeded by the thickness of a bonded bracket, or the like. FIG. 13B shows an aligner positioned on a patient's teeth, with a portion of the aligner receiving the teeth of the section. The aligner may be shaped to elicit movement of the middle tooth or unbracketed tooth as well as accommodate braces positioned on the adjacent teeth. Arrows show example movement or force vectors applied to teeth in the section. Movement of the teeth in one phase of treatment as shown may be followed by use of braces over the entire section of the teeth (e.g., once movement of the teeth has sufficiently occurred so as to permit the placement of a bracket on the middle tooth and/or the practical use of braces on all teeth in the section).

Figure 14:
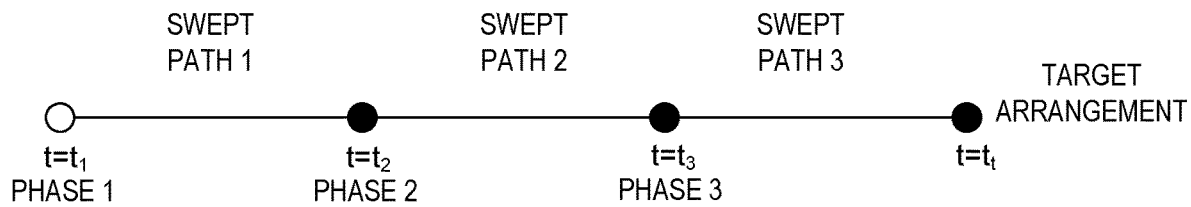
FIG. 14 illustrates a treatment line showing a plurality of phases of orthodontic treatment and a plurality of swept tooth paths, according to an embodiment of the present invention.

As indicated above, the aligners as described herein can be employed individually or as a component of an orthodontic treatment including a number of aligners, appliances, as well as a number of treatment stages or phases. The aligners can be applied to one arch or both. The increment of time in movement between any two positions may include an intermediate position which is a detour and not along the direct path towards the final, if the position is to move a tooth in a non-linear manner (i.e., with a deviation from the most direct path towards the final). Thus, as illustrated with reference to FIG. 14, orthodontic treatment may include a number of treatment stages of phases and may include a number of different movement paths. A phase of treatment may include one or more aligners with a given movement path, such as a plurality of aligners including a particular movement path volume or geometry to accommodate movement of a bracketed tooth or teeth.

It is understood that the examples and embodiments described herein are for illustrative purposes and that various modifications or changes in light thereof will be suggested to persons skilled in the art and are to be included within the spirit and purview of this application and the scope of the appended claims. Numerous different combinations are possible, and such combinations are considered to be part of the present invention. Any stated advantages herein will be recognized as non-limiting and/or optional advantages depending at least partially on the selected design or use according to structures and methods described herein.

What is claimed is:

1. A system for treating a patient having at least one bracketed tooth coupled to at least one bracket of a wire and bracket appliance, the system comprising:
   a computer comprising instructions that, when executed, cause the computer to:
      receive a first position of the at least one bracketed tooth in a treatment plan;
      receive a second position of the at least one bracketed tooth in the treatment plan different from the first position;
      determine a movement path geometry comprising a volume accommodating mesial-distal movement of the at least one bracketed tooth between the first position and the second position, the mesial-distal movement being elicited by force applied by the wire and bracket appliance; and
   a shell appliance comprising a plurality of teeth receiving cavities shaped according to the first and second positions to receive and resiliently position teeth of the patient and a relief portion comprising a cavity defining a geometric volume encompassing at least a volume corresponding to a geometric summation of volumes occupied by the at least one bracketed tooth when following between the first position and the second position.

2. The system of claim 1, wherein the at least one bracket is disposed at least partially outside the relief portion when the at least one bracketed tooth is received within the cavity.

3. The system of claim 1, wherein the relief portion defines an unobstructed insertion path for the at least one bracket when an appliance shell is at least one of: positioned on the patient's teeth or removed from the patient's teeth.

4. The system of claim 3, wherein the relief portion comprises a shortened shell wall extending less than an entire distance between an occlusal portion of the at least one bracketed tooth and a gingival line of the at least one bracketed tooth when the at least one bracketed tooth is received within the cavity so as to provide the unobstructed insertion path for the at least one bracket.

5. The system of claim 4, wherein the shortened shell wall extends partially over the at least one bracket when the at least one bracketed tooth is received within the cavity.

6. The system of claim 3, wherein the relief portion comprises a cutout extending around the at least one bracket when the at least one bracketed tooth is received within the cavity so as to provide the unobstructed insertion path for the at least one bracket.

7. The system of claim 1, wherein the volume is defined by the at least one bracketed tooth moving between a plurality of intermediate positions between the first position and the second position.

8. The system of claim 1, wherein the relief portion is shaped to restrict at least one direction of movement of the at least one bracketed tooth during the mesial-distal movement of the at least one bracketed tooth between the first position and the second position.

9. The system of claim 1, wherein the relief portion comprises an active portion that contacts the at least one bracketed tooth so as to apply a force to the at least one bracketed tooth.

10. The system of claim 1, wherein the relief portion is shaped to accommodate a plurality of bracketed teeth each coupled to a respective bracket of the wire and bracket appliance.

11. The system of claim 1, wherein the medial-distal movement of the tooth geometry comprises inclination, angulation, translation, rotation, intrusion, extrusion, or any combination thereof.

12. The system of claim 1, wherein the relief portion includes an insertion path to receive the bracket or the at least one bracketed tooth.

13. The system of claim 1, wherein the relief portion is shaped to include a protrusion, a bubble, an envelope, or a slot shape, and any combination thereof.

14. The system of claim 1, wherein the relief portion forms an open portion of the shell appliance.

15. The system of claim 14, wherein the open portion of the shell appliance comprises a hole, a window, or an annulus, and any combination thereof.

16. The system of claim 1, wherein the shell appliance is configured to enable one or more directions of tooth movement and restrict other directions of tooth movement.

17. The system of claim 16, wherein the shell appliance is configured to enable rotation and translation of the teeth and restrict extrusion of the teeth.

18. The system of claim 16, wherein the shell appliance is configured to restrict movement of one or more teeth.

19. The system of claim 1, wherein the shell appliance is configured to receive the at least one bracketed tooth and at least one adjacent unbracketed tooth.

20. The system of claim 19, wherein the shell appliance is configured to exert the movement force on both the at least bracketed tooth and the at least one adjacent unbracketed tooth.

* * * * *